United States Patent Office 2,978,395
Patented Apr. 4, 1961

2,978,395
GAMMA RAY POLYMERIZATION OF STYRENE WITH UNSATURATED ESTERS

William C. Hollyday, Jr., Fanwood, and James F. Black, Roselle, N.J., assignors to Esso Research and Engineering Company, a corporation of Delaware No Drawing. Filed Oct. 1, 1954, Ser. No. 459,845

1 Claim. (Cl. 204—154)

This invention relates to a new process for the preparation of lubricating oil additives and to lubricating oil compositions containing them. Particularly the invention relates to a new process for the formation of viscosity index improvers and pour point depressors by copolymerization of styrene and its homologues with unsaturated esters by high energy irradiation to copolymers so prepared, and to lubricating compositions containing such copolymers.

Copolymers of styrene and its homologues with other polymerizable materials, specifically esters of unsaturated materials, are known in the art. U.S. Patent 2,366,517, issued January 2, 1945, to Gleason, teaches the polymerization of styrene type materials with other unsaturates such as fumarate esters to form useful lubricating oil additives. This patent is exemplary of the state of the polymerization art in that it teaches the polymerization reaction in the presence of a peroxide catalyst. It has been known for some time, as exemplified by the patent referred to, that peroxide-catalyzed polymerization of styrene alone, or with other polymerizable materials, has to be run at relatively high temperatures for relatively long periods of time in order to obtain copolymers of sufficiently high molecular weights to be useful as additive materials.

It has now been found that copolymerization of styrene and its homologues with other polymerizable materials such as unsaturated esters, may be carried out at low temperatures and desirably high molecular weight copolymers are obtained in relatively short periods of time by exposing the monomers to the effect of radiation emitted by sources of high energy radioactivity.

In accordance with the present invention, copolymers of the type referred to above are prepared by subjecting a mixture of styrene or one of its homologues and an unsaturated ester to high energy radioactive radiation for a relatively short period of time sufficient to effect the desired degree of copolymerization. Types of radiation suitable for the purposes of invention include high energy electro-magnetic radiation, such as gamma rays and X-rays and high velocity electrons, such as beta rays, as well as alpha particles.

These types of radiation may be supplied by naturally occurring radioactive materials, such as radium and its compounds, which emit alpha, beta and gamma rays. Fission by-products of processes generating atomic power and/or fissionable materials, which emit high energy gamma rays, afford a highly desirable and most abundant source of radioactivity suitable for the purposes of the invention. These by-products include elements with atomic numbers ranging from 30 (zinc) to 63 (europium) and their compounds. They are formed in the course of converting uranium, thorium and other fissionable material in an atomic reactor.

Materials made radio-active by exposure to neutron radiation, such as radioactive cobalt ($Co^{60}$), europium 152 or europium 154 which emit gamma rays, may likewise be used. Suitable sources of high velocity electrons are the beams of electron accelerators, such as the Van de Graaff generator or the betatron. In general, however, high intensity gamma radiation and its well-known sources, such as nuclear fission by-products and materials made radioactive by neutron radiation are preferred for the purposes of the invention mainly because of the relatively high penetrating power of the gamma rays and the availability and ease of application of these sources of gamma radiation.

The gamma radiation arising from an atomic reactor which is producing power and/or fissionable material may also be employed in the concept of this invention. The monomers may be circulated outside the neutron shield surrounding the reactor or they may be circulated through the reactor itself. A reactor producing 1 kg. of plutonium per day would produce also 13 mev. of gamma radiation per fission. 13 mev. of gamma radiation can produce 550,000 ion pairs each of which can initiate the formation of a polymer molecule. Thus, the unit used as a gamma ray source for copolymerization would also be simultaneously producing power and/or fissionable material.

It has been found that unsaturated esters of the type here involved may be copolymerized with styrene or its homologues to form valuable viscosity index improvers and pour point depressors by exposure to radiation of the type specified above. Radiation time and intensity largely depend on the degree of copolymerization, i.e., the molecular weight, desired for the end product. Within the broad operable ranges of a few seconds to several hours, say about 0.5 to 48 hours radiation time and about 10,000 to 2,000,000 roentgens per hour (r./hr.) radiation intensity, copolymer molecular weights of any desired magnitude may be produced. Conversion is the higher the longer the radiation time and the higher the radiation intensity, resulting in higher viscosities of the reaction product. In general, the molecular weight of the copolymer varies directly with the concentration of the reactants in the reaction mixture.

Conditions suitable for the production of most lubricating oil additives coming within the scope of this invention include temperatures of about 0° to 150° F., radiation times of about 1 to 24 hours, preferably about 2 to 10 hours, and radiation intensities of about 10,000 to 5,000,000 r./hr., preferably about 200,000 to 500,000 r./hr.

The process of the invention has the following advantages:

(1) High temperatures are not required to initiate the copolymerization reaction. This means that the copolymerization may be carried out at ambient temperature without providing heat for the process. With peroxide initiated copolymerization, the reaction mixture must be heated to a temperature range in which the peroxide will decompose. In using benzoyl peroxide, one of the more common methods for initiating commercial copolymerization reactions, it is necessary to heat the reactants to a fairly high temperature for polymerization to occur.

(2) The reaction is easily controlled. With peroxide copolymerization catalysts, the rate at which the chain initiators are produced depends not only upon the concentration of the peroxide and the temperature, but also upon little understood secondary chemical changes in the peroxide decomposition products. The rate at which chain initiating gamma rays are produced by the radioactive source is constant. Therefore, at a given temperature the copolymerization will be quite even and not subject to sudden acceleration or deceleration as is the case with peroxide catalysts. Also, with conventional peroxide catalysts it is necessary to heat the reaction mixture to initiate the copolymerization process after which rapid cooling may be required so that the polymerization does not get out of control. Difficult control problems of this type are avoided in accordance with the invention. As a result, the products ordinarily will have a more uniform molecular weight range which will result in quality advantages, e.g., better shear stability.

(3) There is no catalyst contamination in the products copolymerized by gamma irradiation. Since the radioactive material need not come in direct contact with the reactants, and since the gamma rays themselves are merely particles of light, the problem of removing initiating materials from the resulting polymer does not exist. The absence of catalyst contamination in the final product usually results in greater thermal stability of the copolymer. It should be pointed out that gamma ray irradiation does not make a substance radioactive.

(4) Radiation initiation is readily adaptable for continuous copolymerization processes. Since irradiation from an irradiation source is regular and not affected by temperature or other outside phenomena, the catalytic effect is controlled in radiation initiated copolymerizations solely by the time of residence of the reactant within the irradiation zone. For all practical purposes, the initiator is not consumed as is the case with chemical initiators. In addition, a radiation source, such as a gamma source, produces no products which must be removed from the reaction zone. These features permit the design of a plant which can manufacture polymer on a 24 hour per day basis by merely pumping monomers through the radiation given out by a suitable source.

As was stated above, the improved products of this invention are prepared by copolymerizing styrene or one of its homologues with an unsaturated ester.

The styrene or styrene compound used as one monomer may be used in amounts ranging from about 10.0 vol. percent to about 80.0 vol. percent, based on the total volume of the mixture and may be selected from the group consisting of styrene and the various alkylated styrenes containing alkyl or alkylaryl substituent. Ordinarily substituent groups containing from about 5 to about 18 carbon atoms are operable with methyl, ethyl and alpha-methyl substituted styrene being preferred.

The unsaturated ester monomer copolymerized with the styrene compound may be used in amounts from about 90.0% to 20.0 vol. percent and may be any ester represented by the following formula:

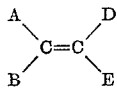

wherein:

(1) A and D are carboxylic acid ester groups

and B and E are hydrogen, i.e., fumaric acid esters, maleic acid esters, etc.

(2) A and D are carboxylic acid ester groups, as above, and either B or E is a methyl group, the other being hydrogen, i.e., citraconic acid esters, meaconic acid esters, etc.

(3) A and B are hydrogen, D is a carboxylic acid ester group, as above, and E is a methylene carboxylic acid ester group, i.e., itaconic acid esters, etc.

(4) A and D are carboxylic acid ester groups as above, E is a methylene carboxylic acid ester group and B is hydrogen, i.e., aconitic acid esters, etc.

(5) A, B and D are hydrogen and E is the group

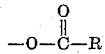

i.e., vinyl acetate, vinyl butyrate, vinyl laurate and the like.

(6) A and B are hydrogen, D is hydrogen or methyl group and E is the ester group

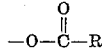

or —COOR, i.e., isopropenyl acetate, acrylic acid esters, methacrylic acid esters, etc.

(7) A, B and D are hydrogen and E is —C≡N, i.e., acrylonitrile, etc.

Of the operable monomers covered by the above, the preferred embodiments are the esters of fumaric, maleic, acrylic and methacrylic acid containing from about 3 to 20 carbon atoms in the ester group, such as the esters of these acids and the following alcohols:

Propanol
Butanol
Hexanol
Heptanol
2-ethyl hexanol
Octanol
Decanol
Dodecanol
Tetradecanol (myristyl alcohol)
Hexadecanol (cetyl alcohol)
Octadecanol (stearyl alcohol)

Particularly desirable are the acid esters of branched chain alcohols produced by the well known catalytic oxonation of $C_7$ to $C_{12}$ olefins with CO and $H_2$, and the commercial mixture of alcohols obtained by the hydrogenation of coconut oil, said mixture containing $C_8$ and $C_{18}$ alcohols.

In some cases, it is desirable to dilute the reagents during the reaction with a suitable solvent which is substantially inert to gamma irradiation, such as a saturated hydrocarbon, carbon tetrachloride or dioxane. In this manner, cross-linking of the polymer to form oil-insoluble gels is inhibited and the product is obtained in a readily usable form.

The copolymers prepared in accordance with the invention may be used as lubricating oil additives in concentrations of about 0.001–10 wt. percent, preferably about 0.01–5.0 wt. percent. When pour depressing is the primary objective, concentrations of about 0.01–0.5 wt. percent are normally sufficient. Larger concentrations of about 0.5–5.0 wt. percent are usually required for appreciable improvements in the viscosity index of the oils.

The oil base stocks in which the copolymers of the invention may be used may be paraffinic oils which normally require pour depressors as well as naphthenic or mixed base lubricating oils requiring viscosity index improvement, or oil blends requiring both pour depressing and viscosity index improving additives. These oils are preferably of lubricating oil grade having viscosities of about 35 to 150 SUS at 210° F. The polymers and copolymers may also be added to greases, paraffin wax or waxy compositions, lighter hydrocarbon oils, such as diesel fuel base stocks requiring pour depressing or other light oils including domestic heating oil base stocks, mineral seal oil, kerosene, etc.

Oil compositions containing the copolymers of the invention may be further improved by the addition of conventional modifying agents, such as dyes, anti-oxidants, tackiness agents, etc., or of other types of pour depressors, such as wax-naphthalene condensation products, wax-phenol condensation products as well as other viscosity index improvers, such as polybutenes, polyvinylethers, etc.

Conventional means of irradiating materials with radioactive radiation may be employed to carry out the process of the invention. For example, batches of the reaction mixtures may be inserted in or reactant streams passed through pipes made of or containing the radioactive material and shielded from the outside to protect the operator. Another suitable arrangement is described in the copending Black et al. application, Serial No. 368,972, filed July 20, 1953, and assigned to the same interests as the present application. In accordance with this procedure, the radioactive materials are stored in the bottom of a concrete or metal-lined pit which is filled with water to a level sufficient to absorb the radiation being emitted. The radioactive materials may be held in metal containers or under a thin layer of concrete to prevent direct contact with the water. The reactants may either be lowered in batches into the pit or passed through pipes through the pit in a position in which they are adequately exposed to the radiation emitted by the radioactive materials. The water acts as a shield protecting the operator above the pit against radiation. No radiation passes through the ground around the pit. Other suitable means for carrying out the process of the invention may appear to those skilled in the art.

The invention will be further illustrated by the following specific examples.

EXAMPLE 1

(a) A mixture of 83 parts by weight of di-Lorol fumarate and 17 parts by weight of styrene was exposed to the radiation emitted by radioactive cobalt ($Co^{60}$). The Lorol B fumarate had been prepared by esterifying fumaric acid with Lorol B alcohols, which is a commercial mixture of normal alcohols containing from 8 to 18 carbon atoms derived from coconut oil and having an average molecular weight of 207. The sample was placed in a sealed glass container contained in an aluminum canister. This aluminum canister was then introduced into the center of a pipe of the radioactive cobalt. The samples were exposed to a radiation intensity of about 235,000 r./hr. at about 70° F. for about 24 hours. At the end of this period, the product was a tough, resinous, slightly rubbery material, almost transparent and completely soluble in hydrocarbon solvents and mineral oils. This product was dissolved in a highly refined white mineral oil having a viscosity of 42 SUS at 210° F. to form a 20% solution, and compared with a product prepared with benzoyl peroxide as a catalyst. This product was prepared as follows:

(b) A mixture of 83 parts di-Lorol fumarate and 17 parts styrene in 25 parts of a highly refined white mineral oil was maintained at 175° F. while the catalyst was added in small increments. A total of 1 wt. percent benzoyl peroxide (based upon the monomers) was added during the first 25 hours of the reaction, and the reaction was continued, maintaining a temperature of 175° F. for a total of 75 hours. Even after this long reaction time the polymer was rather low in molecular weight as shown by comparison in Table I.

Table I
VISCOSITY OF STYRENE-FUMARATE COPOLYMER CONCENTRATES

| Copolymer | Catalyst | Temp., °F. | Time, Hours | Blends in Oil A | |
|---|---|---|---|---|---|
| | | | | Weight Percent | SUS at 210° F. |
| 1 (a) | Gamma Rays | 70 | 24 | 20 | 3,770 |
| 1 (b) | Benzoyl Peroxide | 175 | 75 | 20 | 93.5 |
| (Blend Oil A) | | | | 0 | 42.1 |

Table II
STYRENE-FUMARATE COPOLYMERS AS V.I. IMPROVERS

| Copolymer | Blends in Oil B | | | |
|---|---|---|---|---|
| | Conc., Wt. Percent | SUS at 100° F. | SUS at 210° F. | V.I. |
| 1 (a) | 3.6 | 559.9 | 102.0 | 144.0 |
| 1 (b) | 3.6 | 222.6 | 51.2 | 127.6 |
| (Blend Oil B) | 0.0 | 174.0 | 45.7 | 113.0 |

Table III
STYRENE-FUMARATE COPOLYMERS AS POUR DEPRESSANTS

| Copolymer | ASTM Pour Point, °F., in Mid-Continent SAE-10 Lubricant (Oil C) at Weight Percent Indicated | | | | |
|---|---|---|---|---|---|
| | 0.00 | 0.01 | 0.03 | 0.05 | 0.10 |
| 1(a) | +10 | +5 | −30 | ≤−35 | ≤−35 |
| 1(b) | +10 | 0 | −25 | ≤−35 | ≤−35 |

The foregoing data show that the gamma ray copolymer is an effective viscosity index improver while the peroxide copolymer is not nearly as effective. Both are potent pour depressants.

EXAMPLE 2

A mixture of 83 parts di-Lorol fumarate and 17 parts styrene were dissolved in 25 parts of a highly refined mineral oil having a viscosity of 42 SUS at 210° F. This mixture was exposed to gamma irradiation (by the method described in Example 1) of about 225,000 r./hr. intensity at 150° F. for 5 hours. The product was an excellent viscosity index improver as shown in Table IV.

EXAMPLES 3 THROUGH 5

Preparative details and viscosity index improving properties for these copolymers are described in Table IV.

Table IV
PREPARATION AND PROPERTIES OF STYRENE-FUMARATE COPOLYMERS

| Exp. No. | Monomer Composition | Gamma Irradiation Conditions | | | 3.6% Blends in Oil B | | |
|---|---|---|---|---|---|---|---|
| | | Intensity, R./hr. | Temp., °F. | Time, Hours | SUS, 100° F. | SUS, 210° F. | V.I. |
| 2 | 83 Lorol Fumarate/17 Styrene | 225,000 | 150 | 5 | 266.7 | 57.5 | 137.8 |
| 3 | 80 Lorol Fumarate/20 Styrene | 225,000 | 100 | 8 | 321.2 | 65.0 | 139.5 |
| 4 | 62.5 Lorol Fumarate/16.7 Butyl Fumarate/20.8 Styrene | 210,000 | 70 | 24 | 273.9 | 59.0 | 140.3 |
| 5 | 56.8 Lorol Fumarate/15.2 Butyl Fumarate/28.0 Styrene | 210,000 | 70 | 24 | 291.0 | 62.7 | 143.1 |

EXAMPLE 6

A mixture of 77.3 parts of di-Lorol fumarate and 22.7 parts styrene was stirred with a mixture of 140 parts water, 10 parts heptane and 0.75 part sodium stearate emulsifier. The resultant emulsion was exposed to gamma irradiation at 210,000 r./hr. intensity at 70° F. for 8 hours. The yield of copolymer was 54%, based upon the monomer charged. This product was an excellent pour depressant as shown in Table V.

EXAMPLE 7

This copolymer was prepared similar to Example 6 except irradiation was for 24 hours. The yield of copolymer was 83% and this product was also an excellent pour depressant as shown in Table V.

Table V
STYRENE-FUMARATE COPOLYMERS AS POUR DEPRESSANTS

| Example No. | ASTM Pour Point, °F., in Mid-Continent SAE-10 Lubricant (Oil C) at Weight Percent Indicated | | | | |
|---|---|---|---|---|---|
| | 0.00 | 0.01 | 0.03 | 0.05 | 0.20 |
| 6 | +10 | −20 | −25 | <−35 | <−35 |
| 7 | +10 | −10 | −30 | <−35 | <−35 |
| | Blends in Mid-Continent SAE-20 Lubricant (Oil D) | | | | |
| 6 | +15 | −20 | −20 | −20 | −30 |
| 7 | +15 | −5 | −20 | −20 | −30 |

To illustrate the difference between the copolymeric materials prepared in accordance with this invention from those of the prior art as described in U.S. Patent 2,366,517, referred to above, details of preparation and inspection of two examples of that patent are set out in Table VI below.

Table VI
EXAMPLES FROM U.S. PATENT 2,366,517

| Reactants | Reaction Conditions | | | 3.6% Blend SUS/ 210° F.[1] | Mol. Wt.[2] |
|---|---|---|---|---|---|
| | Catalyst, Percent Bz$_2$O$_2$ | Time, Hours | Temp., °F. | | |
| C$_{12}$ Maleate/Styrene | 2 | 48 | 275 | 54.5 | 5,300 |
| C$_8$ Fumarate/Methyl Styrene | 1 | 72 | 230 | 60.0 | 8,500 |

[1] Viscosity, SUS/210° F. of 3.6 wt. percent copolymer in base oil of 45.9 SUS/210° F. (Oil B).
[2] Molecular weights estimated from 3.6% blends.

For purposes of comparison and to illustrate a copolymer of equal molar proportions of Lorol fumarate and styrene were prepared using gamma ray irradiation and a copolymer of C$_{10}$ fumarate mixture and styrene was prepared using a peroxide catalyst. The latter copolymer had the highest molecular weight of any of the laboratory preparations of styrene copolymers, but was less than ⅓ the molecular weight of the copolymer prepared with gamma rays. Data on these preparations are set out in Table VII below.

Table VII
COMPARISON OF REACTION CONDITIONS AND PRODUCTS

| Reactants | Reaction Conditions | | | Conv., Percent | 3.6% Blend SUS/ 210° F.[1] | Molecular Weight[2] |
|---|---|---|---|---|---|---|
| | Percent Bz$_2$O$_2$ | Time, Hours | Temp., °F. | | | |
| 82.6 g. Lorol Fumarate/17.4 g. Styrene (equimolar). (Gamma rays.) | -- | 24 | 70 | 81.3 | 131.0 | 24,500 |
| 158 g. C$_{10}$ Fumarate/42 g. Styrene (equimolar) | 1 | 35 | 170 | 74.3 | 59.0 | 8,000 |

[1] See Table VI above.
[2] See Table VI above.

The data of Tables VI and VII above show that it is a practical impossibility to obtain copolymeric materials in the molecular weight range from about 12,500 to about 30,000, the range most practical for viscosity index improvers, using peroxide catalyst technique. The high molecular weight copolymers prepared by gamma rays are thus of a different type structure and are substantially different from those obtained with a peroxide catalyst.

To summarize briefly, the instant invention relates to new lubricating oil additives and to compositions containing them and to the new process for their preparation. Briefly stated, the invention comprises the copolymerization of a styrene selected from the group of styrene, methyl styrene, ethyl styrene and alpha-methyl styrene with a polymerizable material of the formula

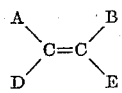

where A and E are selected from the group of hydrogen atoms and —COOR groups, R being an alkyl group containing from 3 to 20 carbon atoms wherein B is selected from the group of hydrogen atoms, methyl groups and —COOR groups and wherein D is hydrogen. Particularly preferred among the unsaturated materials are esters of fumaric acid, maleic acid, acrylic acid and methacrylic acid. Polymerization conditions operable include temperatures of from 0° to 150° F., times of from 0.5 to 48 hours, preferably 2 to 10 hours, and radiation in the order of 10,000 to 5,000,000 roentgens per hour, preferably 200,000 to 500,000 r./hr. The monomers may be polymerized in amounts ranging from 20% to 80% of the styrene compound with from 80% to 20% of the unsaturated ester. These copolymeric materials are blended in lubricating oils in amounts varying between about 0.001 to about 10.00%, preferably from 0.01 to about 5.0 weight percent.

What is claimed is:

A process for the preparation of copolymeric lubricant additives which comprises subjecting a mixture of 80 to 20% of a styrene and 20 to 80% of a diester of fumaric acid containing 3 to 20 carbon atoms in the ester group, to a total dosage of high energy ionizing radiation in the range of $2 \times 10^4$ to $5 \times 10^7$ roentgens to form a copolymer having a molecular weight of 12,500 to 30,000.

References Cited in the file of this patent
UNITED STATES PATENTS

| | | |
|---|---|---|
| 2,366,517 | Gleason | Jan. 2, 1945 |
| 2,668,133 | Brophy et al. | Feb. 2, 1954 |
| 2,803,598 | Black et al. | Aug. 20, 1957 |

FOREIGN PATENTS

| | | |
|---|---|---|
| 1,079,401 | France | May 19, 1954 |

OTHER REFERENCES

"Nature," April 15, 1939, vol. 143, p. 640.
"Symposium on Utilization of Radiation From Fission Products," Harwell, an A.E.R.E. report, February 23–24, 1953, pp. 116 and 117.
"Nucleonics," October 1953, p. 20.
"Modern Plastics," September 1954, pp. 150, 237 and 238.